US007164857B2

(12) United States Patent
Asai et al.

(10) Patent No.: US 7,164,857 B2
(45) Date of Patent: Jan. 16, 2007

(54) COMMUNICATION TERMINAL AND PROGRAM

(75) Inventors: Mao Asai, Yokosuka (JP); Nobuyuki Watanabe, Sayama (JP); Masayuki Tsuda, Tokyo (JP); Yasunori Hattori, Fujisawa (JP); Tatsuro Oi, Kawasaki (JP); Masakazu Nishida, Yokosuka (JP); Naoki Naruse, Yokohama (JP); Yuichi Ichikawa, Yokosuka (JP); Atsuki Tomioka, Yokohama (JP); Masato Takeshita, Mitaka (JP); Kazuhiro Yamada, Yokohama (JP); Satoshi Washio, Tokyo (JP); Dai Kamiya, Tokyo (JP); Naoki Yamane, Tokyo (JP); Keiichi Murakami, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/810,502

(22) Filed: Mar. 26, 2004

(65) Prior Publication Data

US 2005/0002666 A1 Jan. 6, 2005

(30) Foreign Application Priority Data

Mar. 28, 2003 (JP) ............................. 2003-092290

(51) Int. Cl.
G03B 29/00 (2006.01)
H04N 5/76 (2006.01)
H04N 5/222 (2006.01)
H04N 5/225 (2006.01)
H04N 7/14 (2006.01)
H04N 9/09 (2006.01)

(52) U.S. Cl. ................ 396/429; 348/220.1; 348/231.6; 348/262; 348/333.02; 348/14.02

(58) Field of Classification Search ............. 348/220.1, 348/222.1, 231.99, 231.1, 231.6, 262, 552, 348/333.01, 333.02, 14.02; 396/552, 429
See application file for complete search history.

(56) References Cited

U.S. PATENT DOCUMENTS

| 6,795,715 | B1 * | 9/2004 | Kubo et al. ............... 455/556.1 |
| 2002/0030749 | A1 * | 3/2002 | Nakamura et al. .......... 348/220 |
| 2002/0171747 | A1 * | 11/2002 | Niikawa et al. ....... 348/333.01 |

FOREIGN PATENT DOCUMENTS

JP 2002-218028 8/2002

OTHER PUBLICATIONS

URL 1 (http://www.nttdocomo.co.jp/p_s/imode/java/—URL 1 includes a link to a URL2. (4 pages).

(Continued)

*Primary Examiner*—W. B. Perkey
(74) *Attorney, Agent, or Firm*—Brinks Hofer Gilson & Lione

(57) ABSTRACT

To provide a mechanism that enables preparation of a program for photographing regardless of the type of camera device and obtaining image data in a unified format. Mobile phone 10 comprises: means for selecting a camera device; means for generating, in a case that image data of said object photographed by a selected camera device is to be stored, a camera object including attributes corresponding to said camera device; means for calling a program to photograph an object; means for photographing the object with said camera device in accordance with the program called by the camera function calling means and for storing image data representing image of said object in the camera object; and means for obtaining image data stored by the image storing means in a unified format from the camera object.

10 Claims, 3 Drawing Sheets

OTHER PUBLICATIONS

URL 2 (http://www.nttdocomo.co./jp/p_s/imode/java/jguide504_opt.) Chapter 9—Camera control (4 pages).

URL 3 (http://www.itmedia.co.jp/mobile/0211/15/n_frame.html) A concise explanation of URL 3 (4 pages).

* cited by examiner

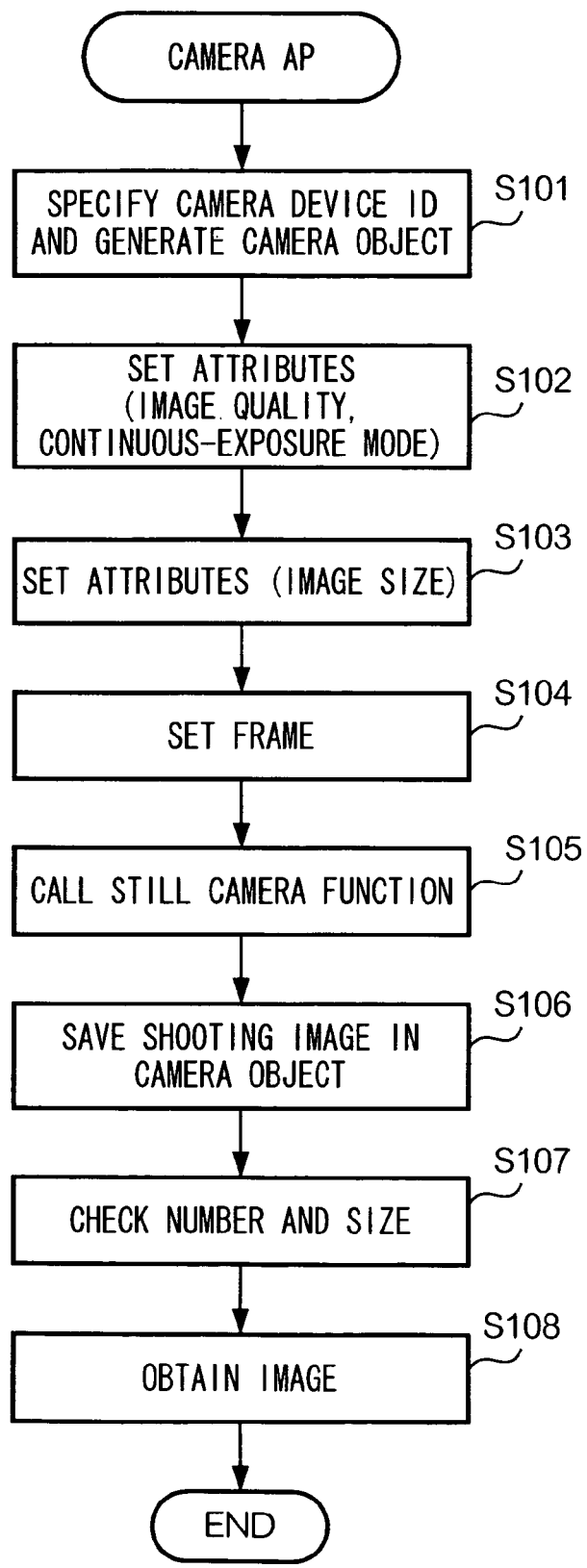

COMMUNICATION TERMINAL AND PROGRAM

This application claims priority under 35 U.S.C. §119 to Japanese Patent Application No. 2003-092290 filed Mar. 28, 2003, the entire content of which is hereby incorporated by reference.

TECHNICAL FIELD

The present invention relates to a communication terminal provided with a camera.

RELATED ART

In recent years, an increasing number of mobile phones equipped with digital cameras including image storing devices have been developed. Such a mobile phone is designed so that a digital camera provided therein takes a photograph when a photograph command is outputted from a CPU (for example, refer to Japanese Patent Application Laid-Open Publication No. 2002-218028). A non-volatile memory of a mobile phone stores a program for controlling a digital camera and a program for controlling functions such as processing and changing image data acquired as a result of taking a photograph. The contents of programs and the types of digital camera are independently determined by mobile phone manufacturers.

Accordingly, methods for preparing application programs to control image photographing and to process image data, and methods for operating mobile phones to photograph and process images, differ depending on the type of mobile phone or camera.

Thus, depending on the type of camera, a user of a mobile phone is required to perform different operations when taking a photograph and a programmer is required to prepare different application programs, which causes inconvenience to the user, and makes development of the programs complicated.

An object of the present invention is to provide a method that enables preparation of a program which allows photographing regardless of the type of camera device, and obtaining image data in a unified format.

SUMMARY OF THE INVENTION

To solve the stated problem, the present invention provides a communication terminal, comprising a plurality of camera devices for photographing an object, and a camera device controlling means for controlling the plurality of camera devices, wherein the camera device controlling means comprises: a selecting means for selecting one of the plurality of camera devices; a camera object generating means for generating, in a case that image data of the object photographed by the selected camera device is to be stored, a camera object including attributes corresponding to the camera device; an attribute setting means for changing the attributes of the camera object generated by the camera object generating means; a camera function calling means for calling a program for photographing the object; image storing means for photographing the object with the camera device in accordance with the program called by the camera function calling means and for storing image data representing an image of the object in the camera object generated by the camera object generating means; image processing means for obtaining image data stored by the image storing means in the camera object in a unified format.

The present invention provides a program for causing a computer to function as: selecting means to select one of a plurality of camera devices; camera object generating means for generating in case that image data of the object photographed by a camera device selected by the selecting means is to be stored, a camera object including attributes corresponding to the camera device; attribute setting means for changing the attributes of the camera object generated by the camera object generating means; camera function calling means calling a program for photographing the object; image storing means for photographing the object with the camera device in accordance with the program called by the camera function calling means and for storing image data representing an image of the object in the camera object generated by the camera object generating means; and image processing means for obtaining image data stored by the image storing means in the camera object in a unified format from the camera object.

According to the present invention, a communication terminal generates an object including attributes corresponding to a selected camera device and calls a program for photographing the object after changing the inputted attributes. By executing a called program a communication terminal photographs an object using the camera device and stores image data representing the photographed object in the object. A communication terminal obtains image data stored in the camera object in a unified format from the camera object.

BRIEF DESCRIPTION OF THE DRAWINGS

[FIG. 3] A flow chart explaining the operation of a camera AP performed by a CPU, in a mobile phone of the embodiment.

BEST MODE FOR CARRYING OUT THE INVENTION

Figure 1:
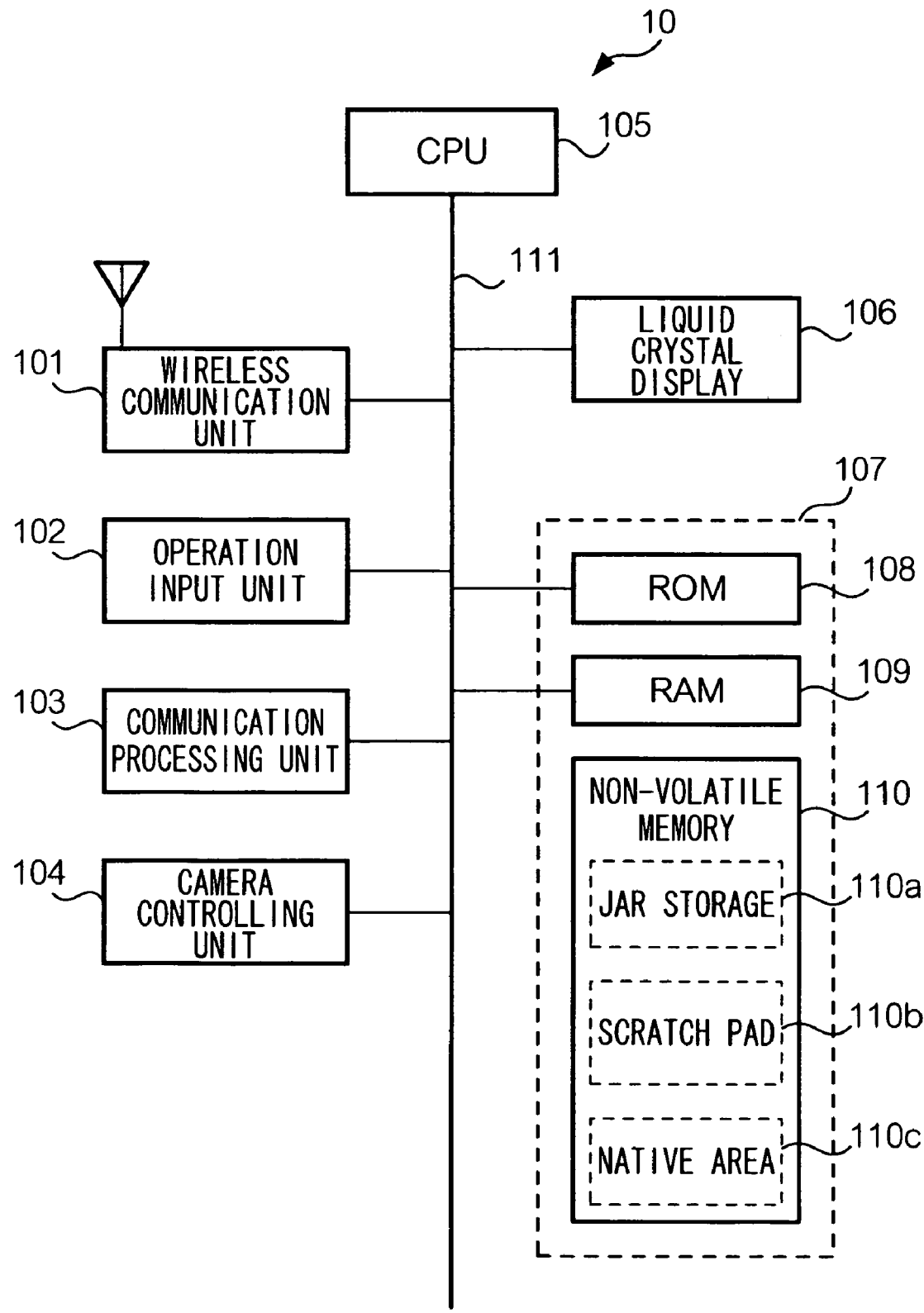
[FIG. 1] A block diagram showing the hardware configuration of a mobile phone, according to the embodiment of the present invention.

Referring to the drawings, explanation with regard to the embodiments of the present invention will be given. Same reference numeral is denoted by the common components in each figure.

1. First Embodiment
1. Configuration

FIG. 1 is a block diagram showing the hardware configuration of a mobile phone 10 according to the present embodiment. As shown in the figure, mobile phone 10 has the same configuration as a typical computer device. Further, mobile phone 10 includes a wireless communication unit 101 performing radio communication with a base station of a mobile communication network (not shown); an operation input unit 102 with a keypad operated by a user, which outputs signals in accordance with the key operation; and a communication processing unit 103 for connecting or disconnecting a call performed between a destination device which communicates over a mobile communication network.

As shown, a camera controlling unit 104 acts as a typical camera that photographs an object. Camera controlling unit 104 includes two types of camera devices; one camera device is for photographing still images; the other camera device is for photographing moving images. Each camera device has a lens, an image pickup device including a CCD (Charge Coupled device), an A/D converter, an image processing circuit, and a shutter. An image of an object is converted into an optical image and formed on an image pickup device. The imaging device converts the intensity of light corresponding to the optical image into quantities of electrical charge. An analogue video signal outputted from an image pickup device is converted by an A/D converter into image data in a digital video signal and displayed on a liquid crystal display 106. Image data photographed by pressing a shutter is stored temporarily in RAM 109. The image processing circuit performs compressing/expanding of image data in accordance with JPEG (Joint Photographic Experts Group image compression technology).

Storage unit 107 comprises a ROM 108, a RAM 109, and a non-volatile memory 110. In ROM 108, are stored an operating system for mobile phone 10 (hereinafter, referred to as "OS"), or software for building a Java Runtime Environment for making application programs formed by byte code conforming to Java specifications operable, or camera device ID data used for identifying the type of camera device in camera controlling unit 104, or data representing attributes (size of image data, image quality, valid/invalid status of continuous-exposure mode, mike volume, a value of presence or absence of frame image) in default and changeable attributes. RAM 109 is used as a work area of CPU 105 and temporarily stores various programs or data executed by CPU 105. RAM 109 stores, for example, data of a camera object (described later).

Non-volatile memory 110 stores native application programs or data which are provided to achieve the functions of mobile phone 10 at the time of shipping mobile phone 10. The native application programs include such as World Wide Web (WWW) browser, a program for executing a call function of mobile phone 10, and a camera function for photographing images using camera controlling unit 104.

In non-volatile memory 110 are provided Jar storage 110a, a scratch pad 110b, and a native area 110c.

Jar storage 110a stores downloaded JAR (Java Archive) files. A JAR file is a compressed file including Java-AP. Scratch pad 110b stores data downloaded with JAR files and data prepared by executing Java applications. Native area 110c temporarily stores a telephone number, data of originating and receiving history, and frame image data for combining with image data of image and displaying on a liquid crystal display at the time of photographing.

Figure 2:
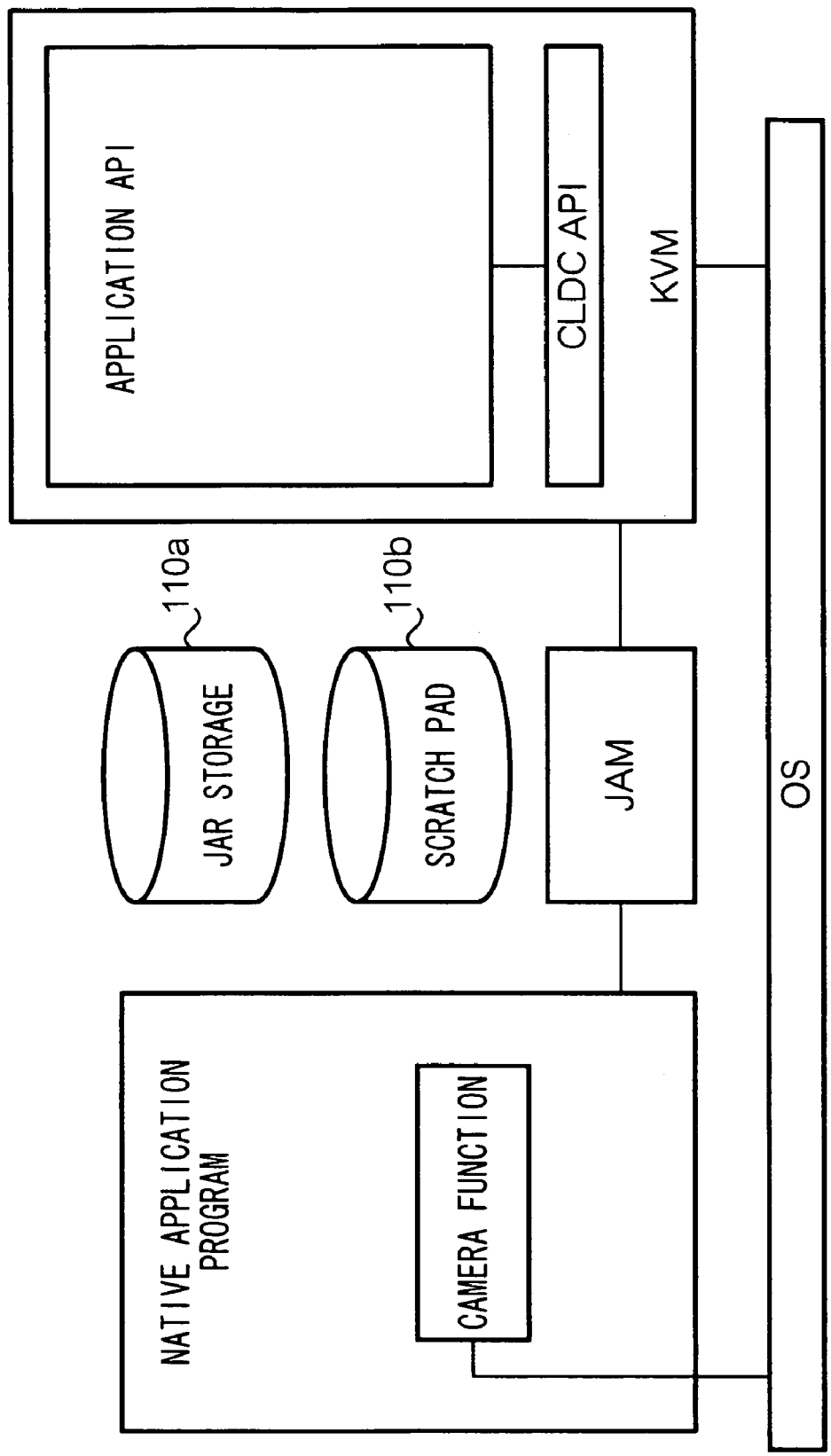
[FIG. 2] A diagram explaining the Java executing environment of a mobile phone, according to the embodiment.

FIG. 2 is a diagram explaining the Runtime Environment of Java-AP executed by software stored in storage unit 107 of above described mobile phone 10.

KVM is a Java Virtual Machine (JVM) designed for small electronic equipment with restricted memory capacity, processing speed, and power consumption compared to a personal computer device. The KVM interprets and performs the byte code of Java-AP included in JAR file, thereby allowing mobile phone 10 to execute an application involving Java-AP.

KVM provides a Java-AP with API for accessing a resource of mobile phone 10. Such API includes an API for employing a class library conforming to Connected Limited Device Configuration (CLDC) and an application API for employing a class library not conforming to CLDC. By using a resource through application API, KVM is able to perform processes such as collaboration between Java-AP and a native application program, infrared communications, network connection in accordance with Hypertext Transfer Protocol (HTTP) or Hypertext Transfer Protocol Security (HTTPS), provision of user interface, and data saving in scratch pad 10. Unlike other native application programs, KVM is activated when a user inputs an instruction to activate it.

JAM downloads JAR file and ADF (Application Descriptor File) to mobile phone 10. JAR file is stored in JAR storage 110a. Written in ADF is information related to JAR file, such as AppClass key specifying the main class name used when activating the corresponding Java-AP or Spsize indicating the capacity of scratch pad 110b allocated to the Java-AP. JAM refers to the descriptive content of the ADF and manages the execution and the behavior of Java-AP corresponding to the ADF. The management in executing Java-AP involves activation and shut down of Java-AP. The management in behavior of Java-AP includes the bridging of Java-AP and native application program and access control to data stored in non-volatile memory 110.

Native application program, as explained, designates a program preinstalled in mobile phone 10. Native application program is controlled directly by OS. Native application program includes a native application with a camera function. Camera function is a function to photograph an object by camera controlling unit 104.

Application API includes a camera API. When executing a Java-AP, KVM calls native application with a camera function through a camera API and photographs still image or moving image by camera controlling unit 104.

Camera API defines a method for operating data. The function of the method will now be explained.

In the method, CPU 105 reads out from storage unit 107 software for achieving JAM, KVM, OS; then the CPU executes the software. Therefore, the actual acting entity is CPU 105. Hereinafter, for the convenience of explanation, JAM, KVM, and OS is assumed to be an action entity.

(1) Camera Object Generating Method

The method functions to use a camera device ID as a parameter; camera device ID is used for identifying camera device selected for photographing, and for generating a camera object corresponding to the camera using the parameter. KVM reads out from ROM 108 data representing an attribute corresponding to camera device ID and generates a camera object including the data. The camera object stores photographed image data, settable attributes or data representing the set attributes.

(2) Method to Determine Whether Attribute is Settable

The method functions to determine whether the attributes (image size, image quality, continuous mode, mike volume, frame image) of selected camera device is settable.

(3) Photographable Still Image Size Obtaining Method

The method functions to obtain from camera object, data representing the image size of a still image photographable by selected camera device.

(4) Photographable Moving Image Size Obtaining Method

The method functions to obtain from camera object, data representing the image size of moving image photographable by selected camera device.

(5) Maximum Data Size Obtaining Method

The method functions to obtain data representing the maximum data size photographable by selected camera device for photographing moving image.

(6) Available Frame Size Obtaining Method

The method functions to obtain from camera object, data representing the size of frame image available in selected camera device for photographing still image.

(7) Attribute Setting Method

The method functions to set attributes of selected camera device. In a case that the selected camera device is for photographing still image, the method functions to set image quality, valid/invalid status of continuous-exposure mode, mike volume, presence or absence of frame image.

(8) Image Size Setting Method

The method functions to set the size (width and height of rectangle area) of image to be photographed; a size is one of the attributes of the selected camera device. Image size includes L size (288×352 mm) and S size (120×120 mm).

(9) Frame Setting Method

The method functions to specify image data used as a frame image, in a case that the selected camera device is for photographing a still image. Graphics Interchange format (GIF) of transparent color is specified as a frame image. The image size of frame image to be set must be equal to camera image size. In a case that an image is specified by a frame setting method and then photographed, the image without frame image will applied frame image.

(10) Attribute Obtaining Method

The method functions to obtain from camera object, data representing attributes set in a selected camera device.

(11) Still Image Camera Function Calling Method

The method functions to call a native application program having camera function at a still image photographing mode. When the method is called, JAM pauses the execution of Java-AP and activates a native application program having a camera function. Pause is to stop executing Java-AP. When the execution of native application program having a camera function ends, JAM resumes executing Java-AP so as to return to the method. Resume means to restart the execution of paused Java-AP. In a case that a user performs an operation to store photographed image after photographing operation, image data is stored in camera object. In a case that a user does not perform a photographing operation or photographed image storing operation, image data is not stored in camera object. Image data stored in camera object is limited to the latest photographed one image data when a continuous-exposure mode is invalid, whereas, a plurality of image data are stored when a continuous-exposure mode is valid. All image data stored until the method is called is cleared at the time of calling the method.

(12) Moving Image Photographing Method

The method functions to call a native application program having function at a moving image photographing mode.

(13) Input Stream Obtaining Method

The method functions to obtain input stream in order to read out image data stored in specified index of camera object as a byte image data in a JPEG format.

(14) Photographed Image Number Obtaining Method

The method functions to obtain data indicating the photographed number of image data stored in camera object.

(15) Image Data Size Obtaining Method

The method functions to obtain data size of image data stored in correspondence with specified index of camera object.

(16) Image Object Obtaining Method

The method functions to obtain image data corresponding to specified index in camera object as image object including the image data.

(17) Image Clearing Method

The method functions to clear all data in camera object; whereby camera object stores no image data.

Foregoing is a method provided in camera API.

Application API includes API for extracting photographed image data from image object obtained by image object obtaining method and for performing following processes.

1. Draw letters and figures; the figures including, for example, a camera frame on image data.

2. Cut image data.

3. Enlarge or reduce, rotate (90 degrees, 180 degrees, 270 degrees), reverse (right and left, up and down) image data.

Application API includes an API for storing byte image data in a JPEG file format to scratch pad 110*b*; the data being obtained by input stream obtaining method. Application API includes an API for transmitting byte image data in a JPEG file format to a Hypertext Transfer Protocol (HTTP) server device; the data being obtained by input stream obtaining method Application API includes an API for converting byte image into image object.

Application API includes an API for notifying the executing Java-AP the data representing the contents that a user has inputted through operation input unit 102 and to display data on liquid crystal display 106.

Application API includes an API for pausing the execution of the executing Java-AP and to resume pausing Java-AP.

It is therefore intended that the foregoing detailed description be regarded as illustrative rather than limiting, and that it be understood that it is the following claims, including all equivalents, that are intended to define the spirit and scope of this invention.

2. Operation

Referring now to FIG. 3, the operation example of CPU 105 will be explained, wherein CPU executes a Java-AP (hereinafter, "camera AP") by compiling a program that is written a method defined by above described camera API and above explained application API as an executable byte code JAR file including a camera AP and ADF corresponding to the file are assumed to be stored in non-volatile memory 110 after being downloaded to mobile phone 10 from a server device.

Camera controlling unit 104 has a camera device for photographing still image which is correlated with camera device ID "1", and a camera device for photographing moving image which is correlated with camera device ID "2", both IDs are assumed to be stored in ROM 108.

Data representing that attributes (image quality, continuous-exposure mode, image size, and a frame) of camera device for photographing still image are all settable is assumed to be stored in ROM 108. A camera device for photographing still image is assumed to be in ROM 108 data representing that two types of image size, L size and S size, can be set.

Two types of transparent GIF including S size and L size to be combined in photographed image data as frame image are assumed to be stored in scratch pad 110*b*.

In the operation example described below, an explanation will be given in which a user validates a continuous mode of mobile phone 10 and photographs 3 still images in S size at a normal image quality; then, stores the secondly photographed image data in scratch pad 110*b*.

First, a user inputs an instruction to start photographing with a camera AP, by operating an operation input unit 102.

In response to the instruction, JAM reads out an ADF corresponding to the selected camera AP from a non-volatile memory 102. Then, JAM activates KVM by specifying a main class name of camera AP; namely, the class name indicated by AppClass key of ADF. KVM reads out a JAR file corresponding to AppClass key and executes a camera AP included in the JAR file.

KVM first displays on a liquid crystal display 106 a selecting mode, and a user selects the type of camera device to employ for photographing.

The user selects camera device ID "1" for photographing still image.

In response to the instruction, KVM reads out from ROM 108 such data that represents the attributes of default corresponding to inputted camera device ID "1" or data representing settable attributes and generates a camera object including such data (step S101).

Then, the user operates operation inputting unit 102 to confirm which attribute is settable.

In response to the instruction, KVM calls attribute setting right and wrong determination method and obtains data representing whether various attributes (image quality, continuous-exposure mode, image size, and frame) are settable. KVM obtains data indicating that all attributes are settable and displays the data on liquid crystal display 106.

By operating operation input unit 102, the user inputs an instruction to set image quality as "standard" and continuous-exposure mode as "valid".

In response to the instruction, KVM uses the inputted attributes as a parameter and calls attributes setting method to set attributes in camera object (step S102).

A user operates operation controlling unit 102 to display a settable image size.

In response to the operation, KVM calls photographable image size obtaining method and obtains, from camera object, data representing the image size "S size" and "L size" of photographable still image. KVM displays the data on liquid crystal display 106.

The user operates operation input unit 102 and inputs an instruction to set the size of photographing image to "S size".

In response to the instruction, KVM uses data representing the inputted image size "S size" as a parameter and calls Image size setting method, thereby setting data representing image size "S size" in camera object (step S103).

To confirm the settable frame size, the user operates operation inputting unit 102 to input such instruction.

In response to the instruction, KVM calls available frame size obtaining method to obtain data representing the size ("S size" that is same as image size) of available frame image from camera object. KVM displays the data on liquid crystal display 106.

To specify the S size frame image stored in scratch pad 1110b, the user operates operation inputting unit 102 to input such instruction.

In response to the instruction, KVM uses data identifying the specified S size frame image as a parameter for calling frame setting method, thereby setting in camera object, data for identifying S size frame image used at a time of photographing (step S104).

Next, the user operates operation inputting unit 102 and inputs an instruction to activate camera function.

In response to the instruction, KVM calls Still image camera function calling method (step S105). As a result, JAM pauses the executing camera AP through an API for pausing. The JAM then uses attributes set in camera object as a parameter and inputs an instruction to activate a native application program having camera function. In response to the instruction, OS executes a native application program having camera function. The OS reads out from scratch pad 110b, S size frame image data and stores it temporarily in native area 110c. After storing, OS combines image data representing an object inputted from the lens of camera device with frame image data stored in native area 110c and displays them on liquid crystal display 106.

The user is able to refer to the object with frame image displayed on liquid crystal display 106 and input an instruction to take a photograph.

In response to instruction form the user, OS release the shutter to photograph still image. The OS stores temporary the photographed image data in RAM 109.

The user inputs an instruction to store the photographed image in camera object by operation inputting unit 102.

On receiving the instruction, OS stores the photographed image data in camera object (step S106).

The user repeats operation of the photographing instruction method in the same way as described above a total of three times. In this case, a continuous-exposure mode is set to "valid", thus, each time user inputs instructions to photograph and store image data, a plurality of image data are correlated with an index in accordance with the order in which photographs were taken and stored in camera object.

The user instructs inputs an instruction to end photographing through operation inputting unit 102.

In response to the end instruction, OS clears frame image data stored in native area 110c, ends execution of native application program having camera function, and notifies the JAM that the process has ended.

When receiving the instruction that the photographing process has ended, JAM causes camera AP in a pause mode to resume through the API for resumption, so as to have the camera AP restore from still image camera function calling method.

Next, by operating operation inputting unit 102, the user inputs an instruction to confirm the number of photographed images in camera object.

In response to the confirming operation, KVM calls photographed image number obtaining method and obtains photographed image data number, which in this case is "3", stored in camera object (step S107).

KVM displays the obtained photographed image data number on liquid crystal display 106. The user inputs an instruction to confirm the size of second photographed image, after confirming that three images are photographed.

In response to the size confirmation instruction, KVM calls image data size obtaining method and obtains image data size representing the image size "S size" of image stored in correspondence with second index in camera object. KVM then displays the obtained image size data on liquid crystal display 106.

The user then performs an operation to store the second photographed image data in scratch pad 110b of mobile phone 10.

In response to the storing instruction, KVM calls input stream obtaining method data using second index and obtains image data, corresponding with second index stored in camera object, as a byte image data in a JPEG format (step S 108).

KVM stores the obtained data in scratch pad 110b through API for storing data.

Conversely, in a case that a user inputs an instruction to process such as reducing image, KVM calls image object obtaining method and obtains image object including image data. After obtaining image object, KVM extracts image data from the obtained image data and processes the image data to be reduced through an API for processing the image.

In a case that a user transmits image data to server device by operating operation inputting unit 102, KVM calls input stream obtaining method, thereby obtaining image data from camera object as byte image data in a JPEG file format. KVM now transmits the data to a server device.

Consequently, a user is able to photograph with a same camera AP regardless of the type of camera device provided in mobile phone 10. This is because the mobile phone in the present invention is allowed to obtain camera device ID for identifying a camera, and to generate a camera object corresponding to camera device ID.

Attributes such as the size of image data, image quality, continuous-exposure mode, mike volume, and presence or absence of frame image is obtained from camera AP; thus, the default of camera device can be set optionally.

The number and size of image data stored in camera object can be displayed on liquid crystal display 106. Such a function allows a user to confirm the photographable numbers and the number and size at a time of processing or transmitting image data; thus convenience is enhanced.

Further, at a time of photographing, frame image is combined with a object and displayed on liquid crystal display 106; thus, a user is able to confirm the object displayed inside a frame while photographing.

Further, in a case that a continuous-exposure mode is set to valid, a plurality of image data can be stored in camera object; whereas, in a case that a continuous-exposure mode is set to invalid, only data of one image can be stored in camera object. Therefore, an advantage is that image data can be managed by camera object.

As described, the use of the method defined by camera API allows generation of a camera object in accordance with camera device provided in mobile phone 10 and photographing by setting optional attributes and activating application program with camera function.

Further, since the photographed image data can be obtained in a unified data format, the convenience for both the user and the programmer of Java-AP can be improved.

In summary, a camera object including image data or attributes are generated and image data or attributes are controlled and managed in the camera object; thus, regardless of the type of camera device, image data can be managed within a camera object in a unified format.

3. Modifications

An embodiment of the present invention has been explained; the embodiment is described as one example of the present invention, which can be executed in a variety of ways within the scope of its main feature. Another embodiment, for example, can be described as follows.

(1) It is possible to change an attribute as long as native application program with camera function is not activated Specifically, a user inputs an instruction to confirm the image quality currently set by operating operation input unit 102. In response to the instruction, KVM calls attribute obtaining method to obtain attribute value "standard" of image currently set from camera object and displays the information on liquid crystal display 106.

In response to the display, a user sets image quality as "high" through operation input unit 102; and accordingly, KVM uses attribute value "high" of image quality as a parameter to set attribute using.

With attribute obtaining method, as explained, attributes currently set can be obtained from camera object and displayed on liquid crystal display 106. This allows a user each time to confirm the attributes currently set when desiring to change attributes.

(2) Unnecessary image data in camera object may be deleted.

Specifically, a user inputs an instruction to delete image data stored in camera object through operation input unit 12.

In response to the instruction, KVM calls image deleting method and deletes all image data stored in camera object.

(3) The operation described is only one example; the processing order and the settings are not limited to the above operation examples. Not only camera API but also in combination with methods defined by other applications APIs, a variety of Java-APs can be prepared.

(4) In the above embodiment, an explanation is given with regard to Java-AP prepared in Java programming language, but the programming language is not limited to Java. To generate a camera object, however, an object-oriented language is suitable; and particularly, Java programming language is more suitable for Java-AP. This is because mobile phone 10 is equipped with a Java Runtime Environment or method for downloading Java programming language.

(5) In the embodiment, JAM pauses camera AP after calling a program having camera function; conversely, a camera AP may not paused. If camera AP is not paused, however, a conflict is caused by the overlapping of resource used by camera AP and native application program with camera function or an inconvenience is caused when a button for ending the execution of native application program with camera function is pressed while photographing. Thus, suspension is preferred.

(6) Settable/changeable "attribute" is not limited to the described embodiment. Attributes such as Zoom function, lighting state in photographing, image quality correction (brightness, color tone correction, white balance), and sepia-tone photographing.

(7) In the above embodiment, software having function of camera API is preinstalled in storage unit 107 of mobile phone 10. Software with such a function may also be downloaded from a mobile communications network, or storage medium storing such software may be applied to mobile phone 10.

The invention claimed is:

1. A communication terminal comprising:
a plurality of camera devices for photographing an object,
a camera device controlling unit for controlling each of said plurality of camera devices, and
a storage unit; wherein,
said storage unit stores one or more default attributes of each of said plurality of camera devices;
said camera device controlling unit comprises:
selecting means for selecting one of said plurality of camera devices;
reading means for reading out one or more default attributes corresponding to said selected camera device from said storage unit; and
camera object generating means for generating a camera object that is to be used for storing image data of an object photographed by said selected camera device and includes a plurality default attributes that are read out by said reading means.

2. A communication terminal of claim 1, wherein said camera device controlling unit further comprises attribute setting means for changing an attribute included in said camera object generated by said camera object generating means.

3. A communication terminal of claim 1, wherein said camera device controlling unit further comprises:
camera function calling means for calling a program for photographing said object; and
image storing means for photographing said object with said camera device in accordance with said program called by said camera function calling means and for storing image data representing an image of said object in said camera object generated by said camera object generating means.

4. A communication terminal of claim 3, wherein said camera device controlling unit further comprises image processing means for obtaining image data stored by said image storing means in a unified format from said camera object.

5. A communication terminal of claim 3, wherein said camera device controlling unit further comprises pausing means for pausing an execution of another program, when said camera function calling means calls said program for photographing said object in accordance with instruction of said another program.

6. A communication terminal of claim 3, wherein attributes changeable by said attribute setting means include one or more attributes selected from among the size of image data photographed by said camera function calling means, image quality, valid/invalid status of continuous-exposure mode, mike volume, and presence/absence of frame image.

7. A communication terminal of claim 1, wherein said camera device controlling unit further comprises:
settable attribute obtaining means for obtaining attributes changeable by said attribute setting means; and
attribute obtaining means for obtaining attributes included in said camera object.

8. A communication terminal of claim 3, wherein said camera device controlling unit comprises acquiring means for acquiring a number and an image size of image data stored in said camera object.

9. A communication terminal of claim 3 further comprising a display unit, wherein
said storage unit stores a frame image data, and
said camera device controlling unit further comprises frame combining means for combining said frame image data with image data stored in said camera object, and displaying said combined image data on said display unit.

10. A communication terminal of claim 3, wherein
said image storing means has a continuous exposure mode for photographing said object continuously at a certain short time intervals, and
said image storing means stores a plurality of image data of said object in said camera object when said continuous exposure mode is valid, and stores only the latest image data of said object in said camera object when said continuous exposure mode is invalid.

* * * * *